US009754001B2

(12) United States Patent
Banister et al.

(10) Patent No.: US 9,754,001 B2
(45) Date of Patent: Sep. 5, 2017

(54) METHOD OF INTEGRATING REMOTE DATABASES BY AUTOMATED CLIENT SCOPING OF UPDATE REQUESTS PRIOR TO DOWNLOAD VIA A COMMUNICATIONS NETWORK

(71) Applicants: Richard Banister, Vista, CA (US); William Dubberley, Pulaski, TN (US)

(72) Inventors: Richard Banister, Vista, CA (US); William Dubberley, Pulaski, TN (US)

( * ) Notice: Subject to any disclaimer, the term of this patent is extended or adjusted under 35 U.S.C. 154(b) by 319 days.

(21) Appl. No.: 14/462,502

(22) Filed: Aug. 18, 2014

(65) Prior Publication Data

US 2016/0048569 A1   Feb. 18, 2016

(51) Int. Cl.
G06F 17/30 (2006.01)
H04L 29/08 (2006.01)

(52) U.S. Cl.
CPC .. *G06F 17/30575* (2013.01); *G06F 17/30289* (2013.01); *G06F 17/30345* (2013.01); *G06F 17/30557* (2013.01); *G06F 17/30563* (2013.01); *H04L 67/1095* (2013.01); *H04L 67/32* (2013.01)

(58) Field of Classification Search
CPC .................................................. G06F 17/30563
USPC .................................................. 707/625, 694
See application file for complete search history.

(56) References Cited

U.S. PATENT DOCUMENTS

| 5,806,067 | A | 9/1998 | Connor |
| 7,330,997 | B1 | 2/2008 | Odom |
| 7,822,717 | B2 | 10/2010 | Kapoor |
| 7,831,787 | B1 | 11/2010 | Yueh |
| 8,375,010 | B2 * | 2/2013 | Banister ............ G06F 17/30563 707/694 |
| 8,442,951 | B1 | 5/2013 | Brannon |
| 8,666,944 | B2 | 3/2014 | Beatty |
| 9,286,166 | B2 | 3/2016 | Paterson |
| 2002/0078218 | A1 * | 6/2002 | Feig ........................ H04L 29/06 709/231 |
| 2002/0161784 | A1 | 10/2002 | Tarenskeen |
| 2003/0120625 | A1 | 6/2003 | Jackson |
| 2004/0078228 | A1 | 4/2004 | Fitzgerald |
| 2004/0236796 | A1 | 11/2004 | Bhatt |
| 2005/0055518 | A1 | 3/2005 | Hochberg |

(Continued)

*Primary Examiner* — Chelcie Daye
(74) *Attorney, Agent, or Firm* — Patrick Reilly

(57) ABSTRACT

A system and method enable the selection of a time range of database records for download from a source database source and for transfer to a recipient database. A specifically bounded time period is selected to limit the number of data records selected for download in a particular action to those records that are individually associated with date time stamp values falling within the specified time period. This limitation of records selected for inclusion in a download process to data records having associations with date time stamps falling within a limited time range reduces a likelihood of overload in transferring data and thereby reduces the incidence of time-outs in the communication of a source database, any intermediary server or software action, and the recipient database in an updating of the recipient database to reflect a current state of the source database. A plurality of threads may be employed to contemporaneously download records associated with date time stamps having values within a requested time range whereby data records may be downloaded in parallel.

18 Claims, 16 Drawing Sheets

(56) References Cited

U.S. PATENT DOCUMENTS

| | | |
|---|---|---|
| 2006/0179155 A1 | 8/2006 | Bunting |
| 2007/0028056 A1 | 2/2007 | Harris |
| 2007/0106845 A1 | 5/2007 | Chu |
| 2007/0136381 A1 | 6/2007 | Cannon |
| 2007/0185937 A1 | 8/2007 | Prahlad |
| 2008/0263007 A1 | 10/2008 | Schmidt |
| 2009/0077075 A1 | 3/2009 | Bent |
| 2009/0249005 A1 | 10/2009 | Bender |
| 2010/0082553 A1 | 4/2010 | Beatty |
| 2010/0318495 A1 | 12/2010 | Yan |
| 2012/0124081 A1 | 5/2012 | Ebrahimi |
| 2012/0254137 A1 | 10/2012 | Rozenwald |
| 2012/0323924 A1 | 12/2012 | Okun |
| 2013/0191523 A1 | 7/2013 | Buck |
| 2014/0074790 A1 | 3/2014 | Berman |
| 2015/0066865 A1 | 3/2015 | Yara |
| 2015/0142751 A1 | 5/2015 | Bruce |
| 2015/0205850 A1 | 7/2015 | Lu |

* cited by examiner

UREQ.001

UMSG.001

DR.REQ.001

DLOAD.001

| DLOAD.ID.001 | APP.ADDR | RDB.ADDR | REC.001 |
|---|---|---|---|
| REC.003 | REC.100 | REC.200 | REC.N |

FIGURE 14D

TLOAD.001

| TLOAD.ID.001 | LDB.ADDR | APP.ADDR | REC.001 |
|---|---|---|---|
| REC.003 | REC.100 | REC.200 | REC.N |

FIGURE 14E

METHOD OF INTEGRATING REMOTE DATABASES BY AUTOMATED CLIENT SCOPING OF UPDATE REQUESTS PRIOR TO DOWNLOAD VIA A COMMUNICATIONS NETWORK

FIELD OF THE INVENTION

The present invention relates to the relatedness of two or more databases that are at least uni-directionally communicatively coupled within an electronics communications network. More particularly, the invented method relates to revising records of a database by downloading data via an electronics communications network.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The prior art enables the updating of records of software database by downloading updates associated with one or more identified records of the recipient software database. In prior art methods, the quantity of information eligible for downloading to update a recipient database is not optimally estimated or determined by a requesting server in setting a parametric range specified within a record update transmission request. Furthermore, the prior art fails to provide systems and methods that best enable the time-efficient transmission of updates of software database records from a storing server to a networked server.

There is therefore a long-felt need to provide a method and system that provide increased efficiencies of electronic transmission of updates to database records.

SUMMARY AND OBJECTS OF THE INVENTION

Towards these objects and other objects that will be made obvious in light of the present disclosure, a system and method are provided that enable the selection of database records for download from a source database source and for transfer to a recipient database on a criteria of each record selected for download being associated with a date time stamp value falling within a bounded time range. The specifically bounded time period of the method of the present invention (hereinafter, "the invented method") may optionally be selected to limit the number of data records selected for download in a particular action to those records that are individually associated with date time stamp values falling within the specified time period. This limitation of records selected for inclusion in a download process to data records having associations with date time stamps falling within a limited time range reduces a likelihood of overload in transferring data and thereby reduces the incidence of time-outs in the communication of a source database, any intermediary server or software action, and the recipient database in an updating of the recipient database to reflect a current state of the source database. In certain alternate preferred embodiments of invented method, a plurality of threads may be employed to contemporaneously download records associated with date time stamps having values within a requested time range whereby data records may be downloaded in parallel.

The source database is queried to determine the number of record update occurrences stored by the source database within a first time period.

If the number of update occurrences occurring within the first time period is determined to be less than a pre-established maximum count, a download of all record updates within the first time period is initiated, wherein all of these selected record updates are communicated from the source database to the recipient database. In the alternative, when the relevant number of occurrences falling within the first time period exceeds the pre-established maximum count, a second, shorter time period is examined. The source database is further applied to determine the number of record update occurrences stored by the source database falling within the second time period. The source database may thus be repeatedly directed to examine time period bounds until a resultant time period is resolved within which an observed count of record updates falling with the resultant time period is less than the pre-specified maximum count, and within which a download process shall be bounded.

According to an optional aspect of the invented method, the download process may be executed by a multi-threaded technique, wherein the record updates associated with the actually applied time period of a resultant download process are substantively near-simultaneously downloaded to the recipient database via the activity of a plurality of individual threads.

According to an additional optional aspect of the invented method, the source database is directed by an external server to generate record update counts.

According to another optional aspect of the invented method, an application server external from the recipient database may determine the resultant time period by querying the source database for relevant record update counts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIG. 14D is a block diagram of an exemplary first data record download message wherein the remote database server of FIG. 1 provides a plurality of data records to the application server of FIG. 1;

FIG. 14E is a block diagram of an exemplary first data record download transferal message wherein the application server of FIG. 1 provides a plurality of data records to the local database server of FIG. 1.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
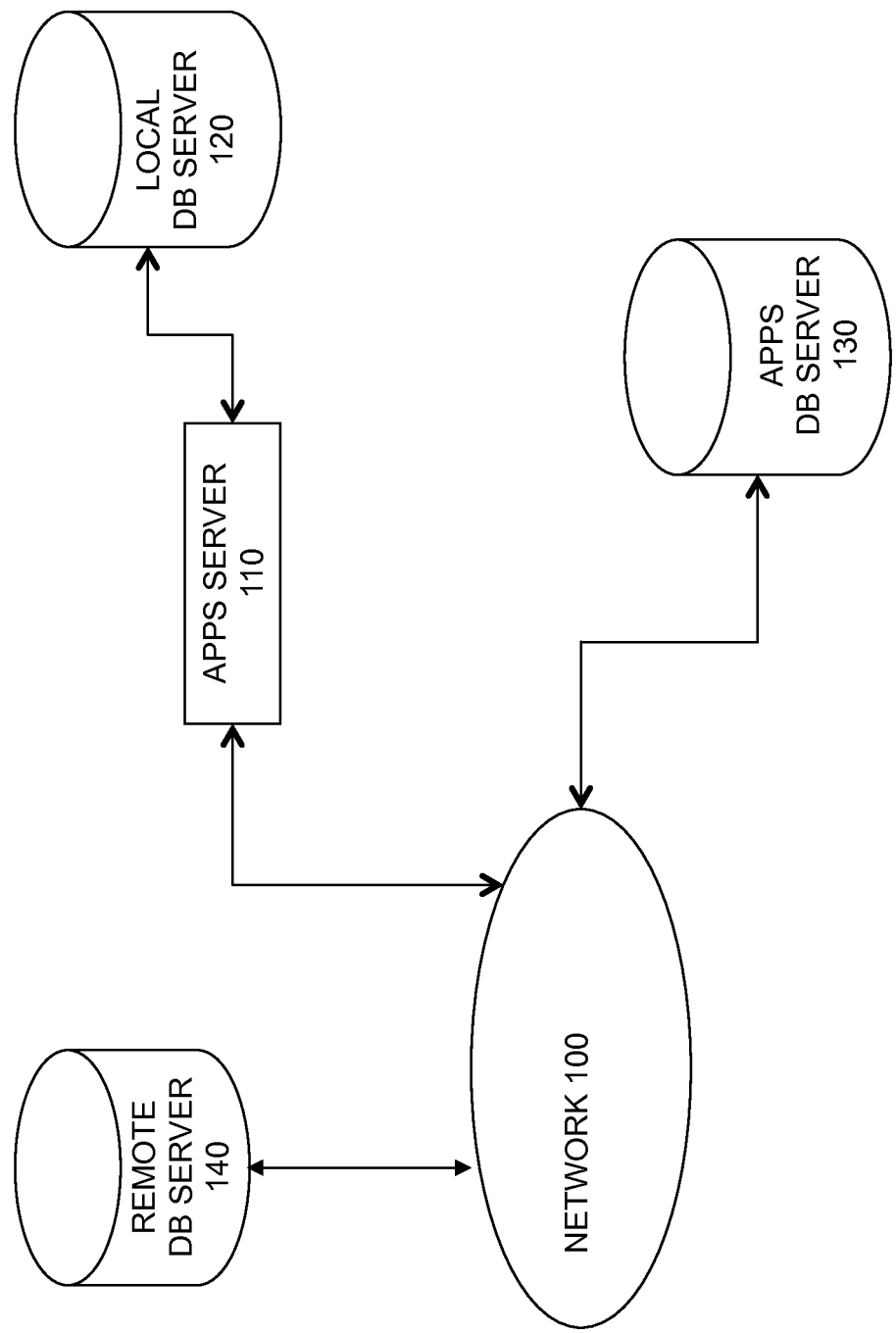
FIG. 1 is a diagram of an electronic communications network comprising a remote database server, an application server, an alternate application database server, and a local database server.

Referring now generally to the Figures, and particularly to FIG. 1, FIG. 1 is a diagram of an electronic communications network 100 comprising an application server 110, a local database server 120, an alternate application database server 130 and a remote database server 140. The applications server 110, the local database server 120 the alternate application database server 130 (hereinafter, "the apps DB server" 130), and the remote database server 140 each preferably comprise a separate database management system software, respectively an application server DBMS 110A, a local DBMS 120A, an apps DBMS 130A, and a remote DBMS 140A.

The application server DBMS 110A, the local DBMS 120A, the apps DBMS 130A and/or the remote DBMS 140A may be or comprise an object oriented database management system ("OODBMS") and/or a relational database management system ("RDBMS"), and one or more databases DBS.1-DBS.N may be or comprise an object oriented database and/or a relational database. More particularly, the application server DBMS 110A the local DBMS 120A, the apps DBMS 130A, or the remote DBMS 140A may be or comprise one or more prior art database management systems including, but not limited to, an ORACLE DATABASE™ database management system marketed by Oracle Corporation, of Redwood City, Calif.; an MQSERIES™ database management system marketed by SyBase, Inc. of Dublin, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; and the POSTGRESQL™ open source object-relational database management system.

The remote database server 140 may bi-directionally communicate and transfer data with the applications server 110 via the network 100 by suitable electronic communications messaging protocols and methods known in the art including, but not limited to, Simple Object Access Protocol, Representational State Transfer, and/or a webservice adapted to conform with the architecture and structure of the World Wide Web. The applications server 110 may bi-directionally communicate and transfer data with the local database server 120 by suitable electronics communications messaging protocols and methods known in the art including, but not limited to, communications conforming to Structured Query Language, Not Only Structured Query Language ("NoSQL"), flat file transfer, and/or bulk loading of information, data and records.

It is understood that the application server 110, the local database server 120, the apps DB server 130, and the remote database server 140 may be a software program hosted and/or enabled by, or may be or comprise a bundled computer software and hardware product such as, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; or (e.) other suitable computational system or electronic communications device known in the art capable of providing or enabling a financial web service known in the art.

It is understood that the apps DB server 130 combines the functionality of the applications server 110 and the local database server 120 of the processes of FIG. 2 and FIG. 4 through FIG. 6.

Figure 2:
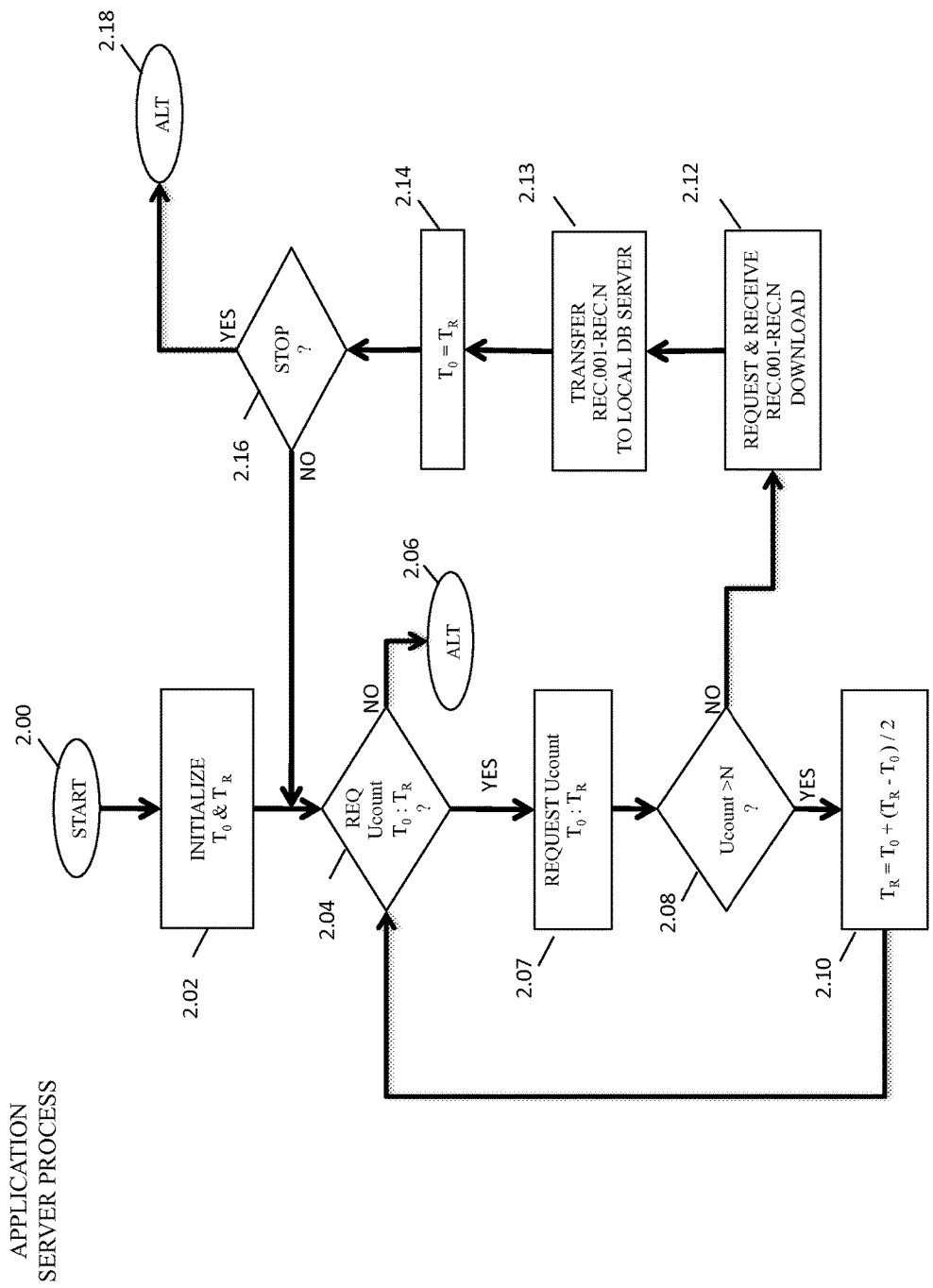
FIG. 2 is a flowchart of certain optional aspects of the invented method relating to the functioning of the application server of FIG. 1 wherein updates are requested and downloaded.

Referring now generally to the Figures, and particularly to FIG. 2, FIG. 2 is a flowchart of a method of the current invention describing the process by which the application server 110 requests and downloads updates from the remote database server 140. It is understood that, as presented in FIGS. 8 through 13 and applied in the methods of FIGS. 2 through 7, each of a plurality of databases RDB.1-RDB.N preferably includes a unique record data REC.DATA.001-REC.DATA.N and an associated date time stamp DTS0.001-DTS.N.

In step 2.02 the application server 110 initializes and defines a $T_0$ time start variable value ("$T_0$") and a $T_R$ time range end variable value ("$T_R$") wherein $T_0$ is a date-time value representing the beginning of a specified time segment and is preferably equivalent to the most recent value date-time stamp DTS.001-DTS.N of the record data REC.DATA.001-REC.DATA.N downloaded from the remote database server 140 to the local database server 120 via the application server 110.

The $T_R$ is a date time value representing the end of the specified time segment, and may be a date time value approximately representing a current execution time of a step or aspect of the invented method. In step 2.04, the application server 110 determines whether to request a number of data records REC.001-REC.N ("Ucount") with the date-time stamps DTS.001-DTS.N having values falling within the specified time segment defined by $T_0$ and $T_R$ from the remote database server 140. If the application server 110 determines not to request the Ucount, it proceeds to step 2.06, wherein it proceeds to perform alternate processes. Alternatively, the application server 110 requests a new Ucount from the remote database server 140, i.e. wherein the Ucount is derived as a count of the number of data records REC.001-REC.N having associated date-time stamp values DTS.001-DTS.N within the time segment defined by $T_0$ and $T_R$.

In step 2.08, the application server 110 receives a Ucount from the remote database server 140 and determines whether the received Ucount is greater than a specified update capacity number N. If the determination made by the application server 110 in step 2.08 is that the most recently received Ucount is greater than the specified update capacity number N, the application server 110 advances to step 2.10, wherein it resets the current date time value of $T_R$ as equal to a date time value closer in time to the current $T_0$.

In step 2.10 the $T_R$ is reset to be equal in value to the summation of (a.) the current $T_0$ and (b.) the delta of the current TR and the current $T_0$ divided by a specified divisor, for example, but not limited to 2. In other words, $T_R$ is reset by first subtracting the current $T_0$ from the current $T_R$, then dividing the resultant delta time value by a specified divisor, and then adding the resultant value to the current $T_0$. The specified divisor applied in a reset calculation of $T_R$ of step 2.10 may be, in various alternate preferred embodiments of the present invention, equal to the whole number two, less than the whole number two, or greater than the whole number two.

The application server 110 subsequently returns to step 2.04 and requests the update count between the initial $T_0$ and the most recently reset $T_R$. The application server 110 repeats the loop of steps 2.04-2.10 until a determination is made in an execution of step 2.08 that the Ucount most recently received from the remote database server 140 is not greater than the specified update capacity number N. The application server 110 subsequently proceeds on to step 2.12 and requests and receives downloads of all data records REC.001-REC.N from the remote database server 140 that each separately comprising a date time stamp DTS.001-DTS.N having a value within the range of the current $T_0$ and the most recently reset $T_R$.

The remote database server 140 may transfer one or more data records REC.001-REC.N to the applications server 110 in step 2.12 via the network 100 by suitable electronic communications messaging protocols and methods known in the art including, but not limited to, Simple Object Access Protocol, Representational State Transfer, and/or a web service adapted to conform with the architecture and structure of the World Wide Web. The applications server 110 transfers all data records REC.001-REC.N received in step 2.12 to the local database server 120 in step 2.13 by suitable electronics communications messaging protocols and methods known in the art including, but not limited to, communications conforming to Structured Query Language, Not Only Structured Query Language ("NoSQL"), flat file transfer, and/or bulk loading of information, data and records.

In step 2.14 the application server 110 resets $T_0$ to be equal to the most recent $T_R$. In step 2.16, the application server 110 determines whether to terminate the process. If the determination to terminate the process is positive, the application server advances to step 2.18, wherein it proceeds to alternate processes. If the determination in step 2.16 is negative, the application server 110 returns to step 2.04, and repeats the loop of steps 2.04-2.16 as necessary.

Figure 3:
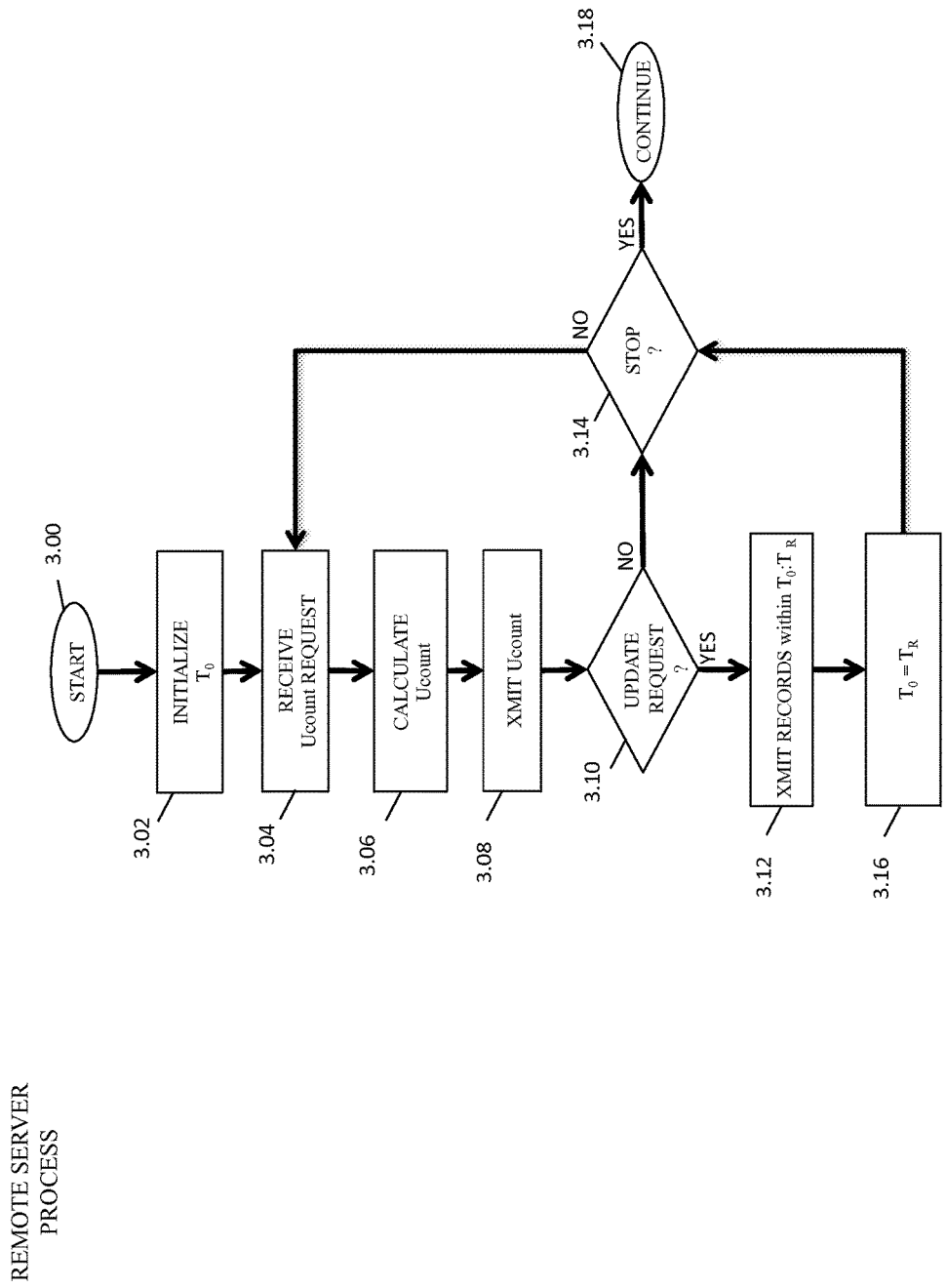
FIG. 3 a flowchart of further aspects of the invented method relating to the functioning of the remote database server of FIG. 1 wherein updates are counted and transmitted.

Referring now generally to the Figures, and particularly to FIG. 3, FIG. 3 is a flowchart of further aspects of the invented method by which the remote database server 140 transmits updates to the application server 110. In optional step 3.02 the remote database server 140 optionally initializes and defines a $T_0$ wherein $T_0$ is a time-date stamp representing the beginning of a specified time segment, generally representing the most recent value of a date time stamp DTS.001-DTS.N of all records REC.001-REC.N previously downloaded from the remote database server 140 to the application server 110.

In step 3.04 the remote database server 140 receives a Ucount request containing the $T_0$ and a current $T_R$. In step 3.06 the remote database server 140 calculates the Ucount to be transmitted to the application server 110, wherein the Ucount is calculated as the total amount of record information REC.DATA.001-REC.DATA.N of database records REC.001-REC.N that are associated with or comprise date time stamps DTS.001-DTS.N having values that fall between the $T_0$ and the $T_R$ received in step 3.04.

In step 3.08 the remote server database 140 transmits the Ucount to the application server 110. The remote database server 140 in step 3.10 determines whether it has received an update request. If the determination in step 3.10 is positive, the remote database server 140 proceeds to step 3.14 wherein it downloads to the application server 110 the record information REC.DATA.001-REC.DATA.N of database records REC.001-REC.N that are associated with date time stamps DTS.001-DTS.N having values within the specified time frame $T_0$:$T_R$ of the Ucount request received in step 3.04. In optional step 3.16 the remote database server 140 resets the value of $T_0$ to the value of $T_R$ received in step 3.04.

When the optional step 3.16 is completed, or if the determination in step 3.10 is negative, the remote database server 140 proceeds to step 3.12, and determines whether to terminate the process of the loop of steps 3.04 through 3.14. If the remote database server 140 determines in step 3.16 to terminate the process of the loop of steps 3.04 through 3.14, it continues to alternate processes in step 3.18. If the determination to terminate in step 3.12 of the process of the loop of steps 3.04 through 3.14 is negative, the remote database server 140 proceeds back to step 3.04, wherein the remote database server 140 waits to receive a new Ucount request message, and continues the loop of steps 3.04-3.12 until the determination is made in step 3.14 to terminate the process of the loop of steps 3.04 through 3.14.

Figure 4:
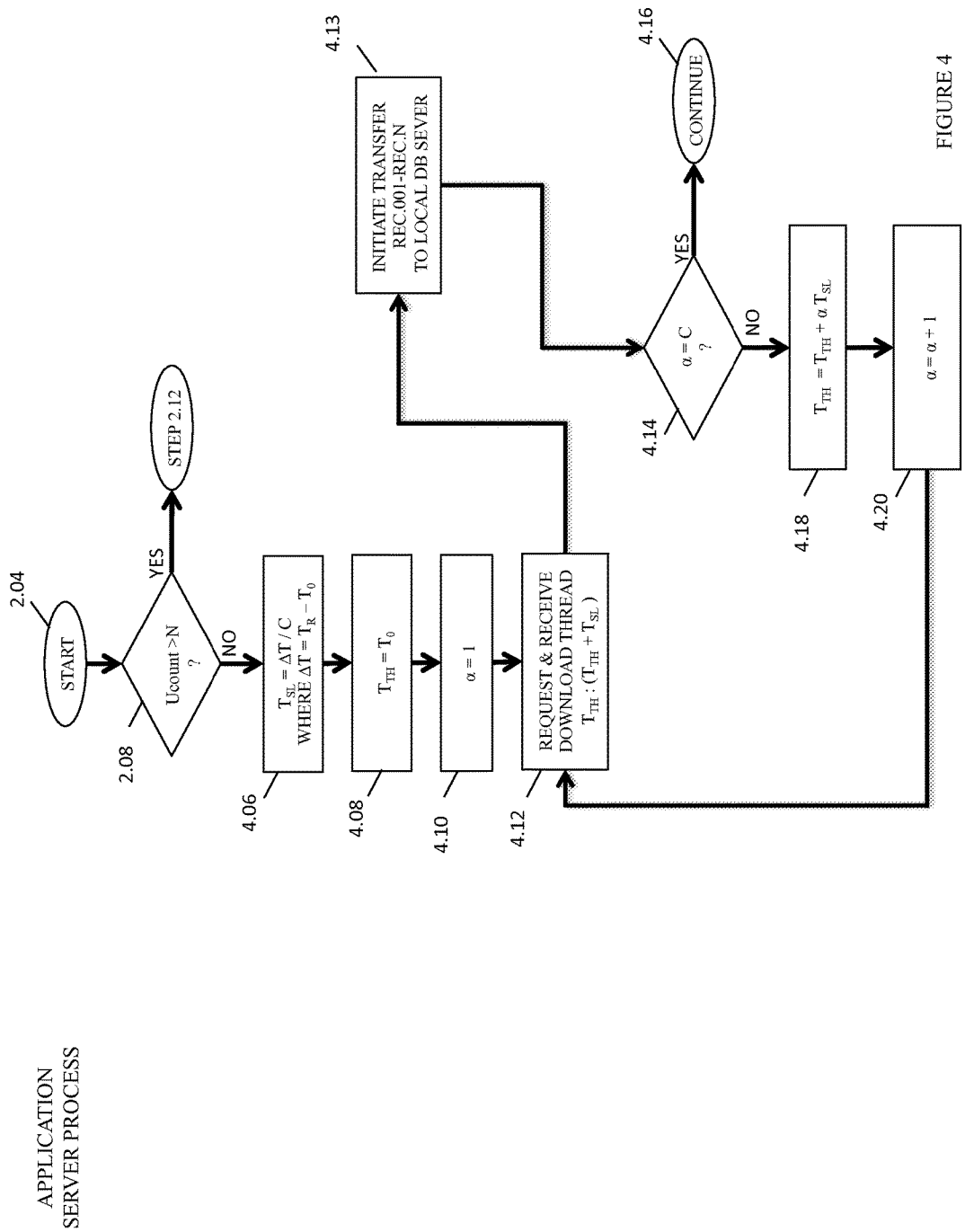
FIG. 4 is a flowchart of yet further aspects of the invented method relating to the application server of FIG. 1, describing the process by which updates are requested, divided between threads, and downloaded.

Referring now generally to the Figures, and particularly to FIG. 4, FIG. 4 is a flowchart of a yet further optional aspects of the invented method wherein record information REC.DATA.001-REC.DATA.N are optionally downloaded through one of a plurality of download threads for the purpose of expediting their download from the remote database server 140 via the applications server 110 to the local database server 120.

In step 2.08 the application server 110 determines whether the Ucount received from the remote database server 140 is greater than the specified update capacity number N. If the determination in step 2.08 is positive, the application server 110 repeats step 2.12 of FIG. 2. In step 4.06 the application server initiates and defines a time slice $T_{SL}$ which is equal to a $\Delta T$ divided by C, where C is a constant representing a specified number of authorized threads, and where $\Delta T$ is the difference between the current $T_0$ representing the beginning of a specified time segment, and the current $T_R$, representing the end of a specified time segment. In step 4.08 the application server 110 creates a date time variable value $T_{TH}$ and sets it as a new beginning time-date stamp $T_0$, where $T_{TH}$ represents a per-thread time segment. The application server 110 in step 4.10 sets a thread counter a to one. In step 4.12 the application server 110 initiates and receives a download thread that transfers data records REC.001-REC.N having date time stamps DTS.001-DTS.N within the time segment between $T_{TH}$ and the sum of $T_{TH}$ and $T_{SL}$, and in step 4.13 transfers data records REC.001-REC.N received from the remote database server 140 to the local database server 120. The applications server 110 may bi-directionally communicate and transfer data to and from the local database server 120 in step 4.13 by suitable electronics communications messaging protocols and methods known in the art including, but not limited to, communications conforming to Structured Query Language, Not Only Structured Query Language ("NoSQL"), flat file transfer, and/or bulk loading of information, data and records.

In step 4.14 the application server 110 determines whether the thread counter a is equal to the number of threads C. If the determination in step 4.14 is positive, the application server 110 proceeds to step 4.16 wherein it continues to alternate processes. If the application server 110 determines in step 4.14 that the thread counter a is not equal to the number of threads C, the application server 110 creates a new per-thread time segment $T_{TH}$, consisting of the sum of the initial $T_{TH}$ plus the product of the value of the thread counter a and the time slice $T_{SL}$. In step 4.20 the thread counter a is incremented by the application server 110 to be equal to a plus one. The application server 110 then proceeds back to step 4.12 and repeats steps 4.12-4.20 until all updates contained within Ucount are assigned to a specified thread.

Figure 5:
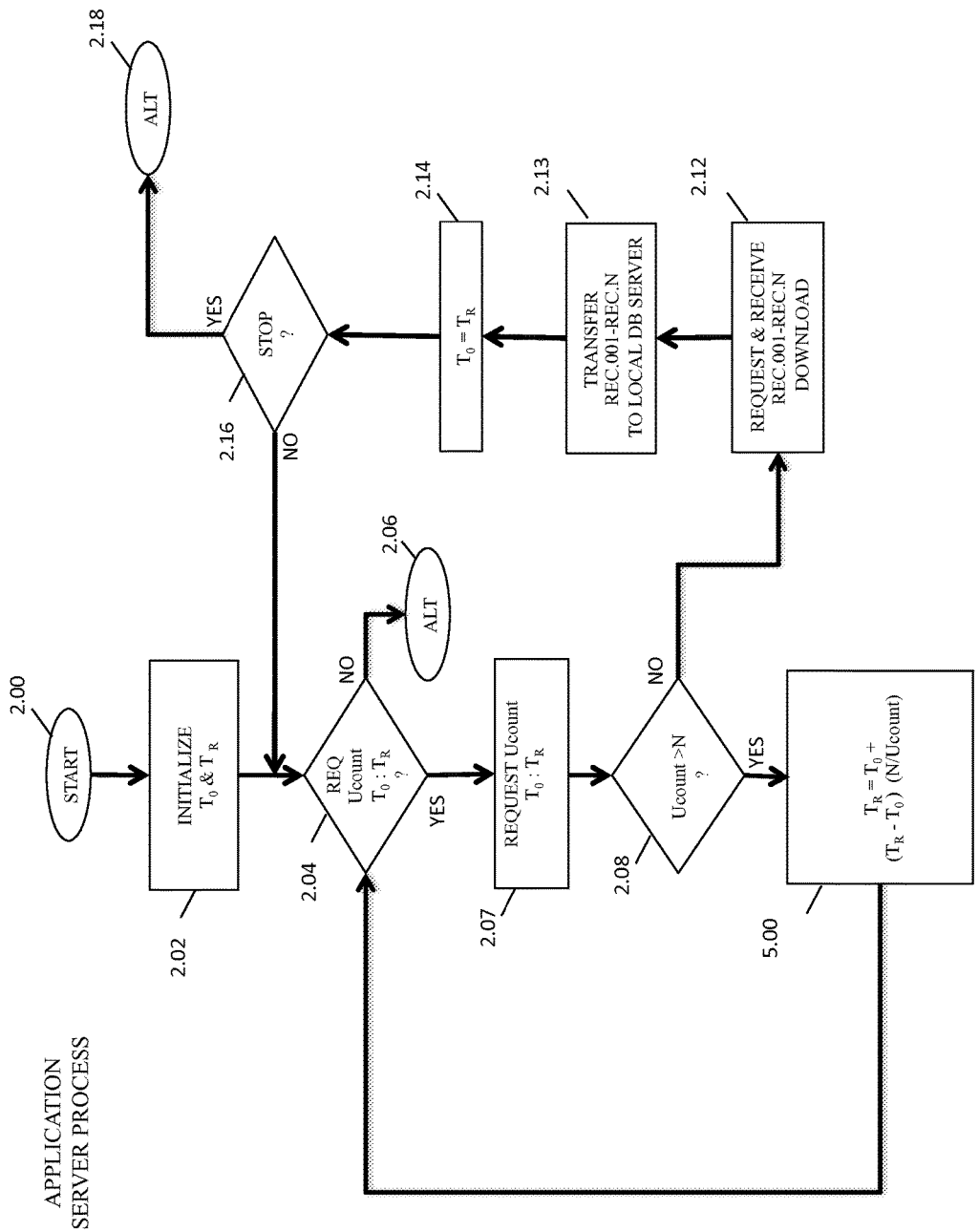
FIG. 5 is a flowchart performed by the application server of FIG. 1 comprising yet alternate optional aspects of the invented method, wherein a requested time range of record updates is developed in accordance with a ratio developed in view of an earlier number of record updates counted and reported preferably within an earlier requested and larger time range.

Referring now generally to the Figures, and particularly to FIG. 5, FIG. 5 is a flowchart performed by the application server 110 comprising yet alternate optional aspects of the invented method, wherein update counts Ucount may be developed and requested in accordance with a ratio developed in view of an earlier Ucount value of record information REC.DATA.001-REC.DATA.N associated with date time stamps DTS.001-DTS.N having values falling within a larger and earlier requested time range $T_0$ to $T_R$. In the method of FIG. 5, the application server 110 performs the steps 2.00 through 2.08 and 2.12 through 2.18 of the method of FIG. 2, and the algorithm of step 2.10 of FIG. 2 is replaced with the ratio based algorithm of step 5.00 that generated a new range of $T_0$ through $T_R$ by the formula of resting $T_R$ to a new value equal to the current $T_0$ plus the resultant value of $(T_R-T_0)$ multiplied by (N/Ucount), as presented in the flowchart of FIG. 5.

Figure 6:
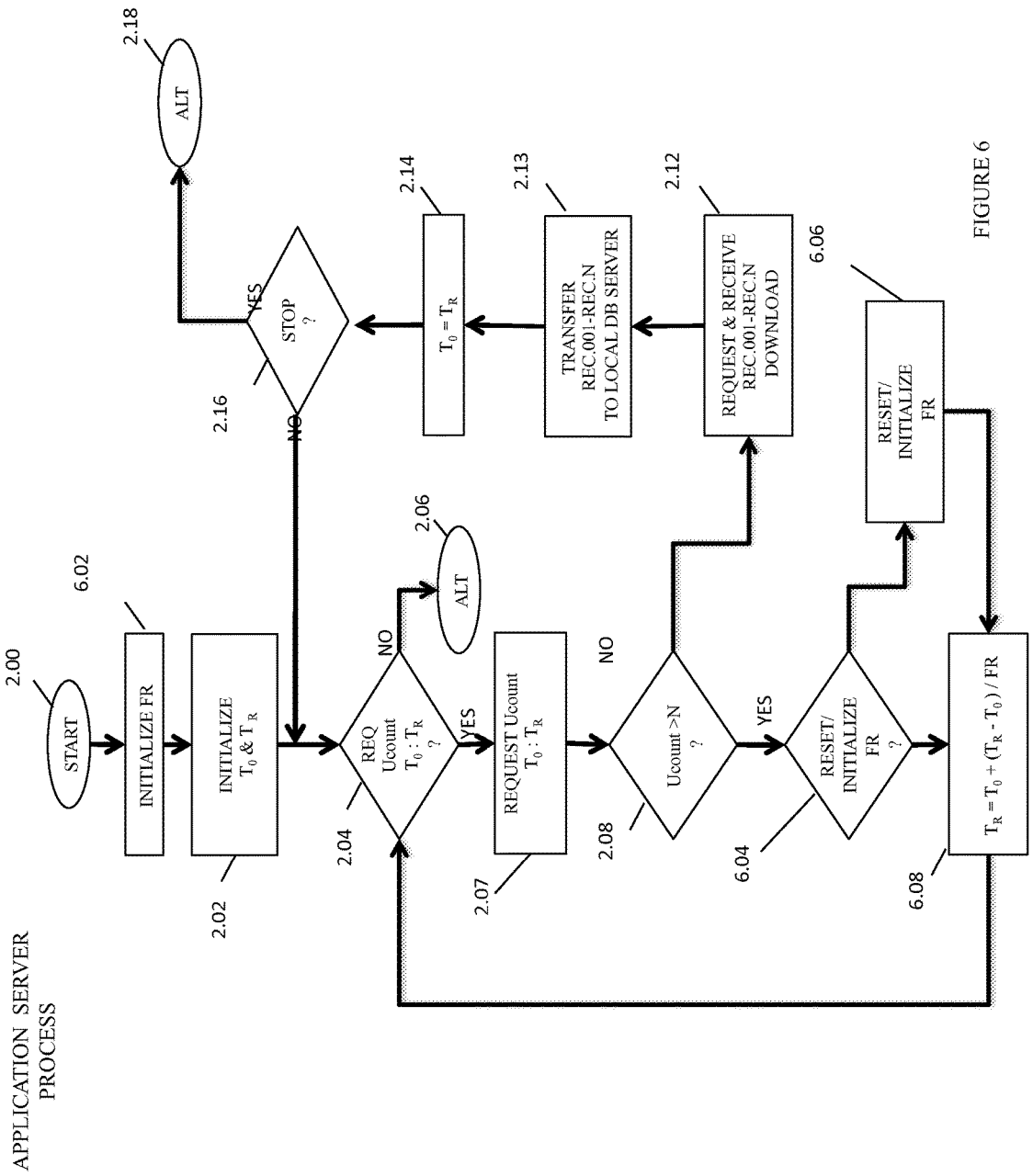
FIG. 6 is a flowchart performed by the application server of FIG. 1 comprising additional alternate optional aspects of the invented method, wherein a requested time range of record updates is calculated by application of a denominator factor FR by which an earlier applied time range is divided by the denominator factor FR to generate a shorter time range that resides preferably within the bounds of the earlier applied time range.

FIG. 6 is a flowchart performed by the application server 110 comprising still alternate optional aspects of the invented method, wherein a requested time range of record updates is developed by application of a denominator factor FR by which an earlier applied time range is divided by the denominator factor FR to generate a shorter time range that resides within the bounds of the earlier applied time range.

In step 6.02 the denominator factor FR is initialized by the application server 110, wherein the denominator factor FR may be received as a user input or from the local database server 120. In optional step 6.04 the application server 110 determines whether the denominator factor FR shall be reset, wherein the reset of the denominator factor FR to a new value of step 6.06 may optionally be directed by user input. In step 6.08 the value of the variable $T_R$ is reset by application of the formula of adding the current $T_0$ to the resultant value of a division of the delta between the current $T_0$ and the current $T_R$ by the denominator factor FR. It is understood that the denominator factor FR may be a variable that may be in various instances of the invented method (a.) greater in numeric value than the whole number two, (b.) equal to the whole number two, or (c.) lesser in numeric value than the whole number two.

Figure 7:
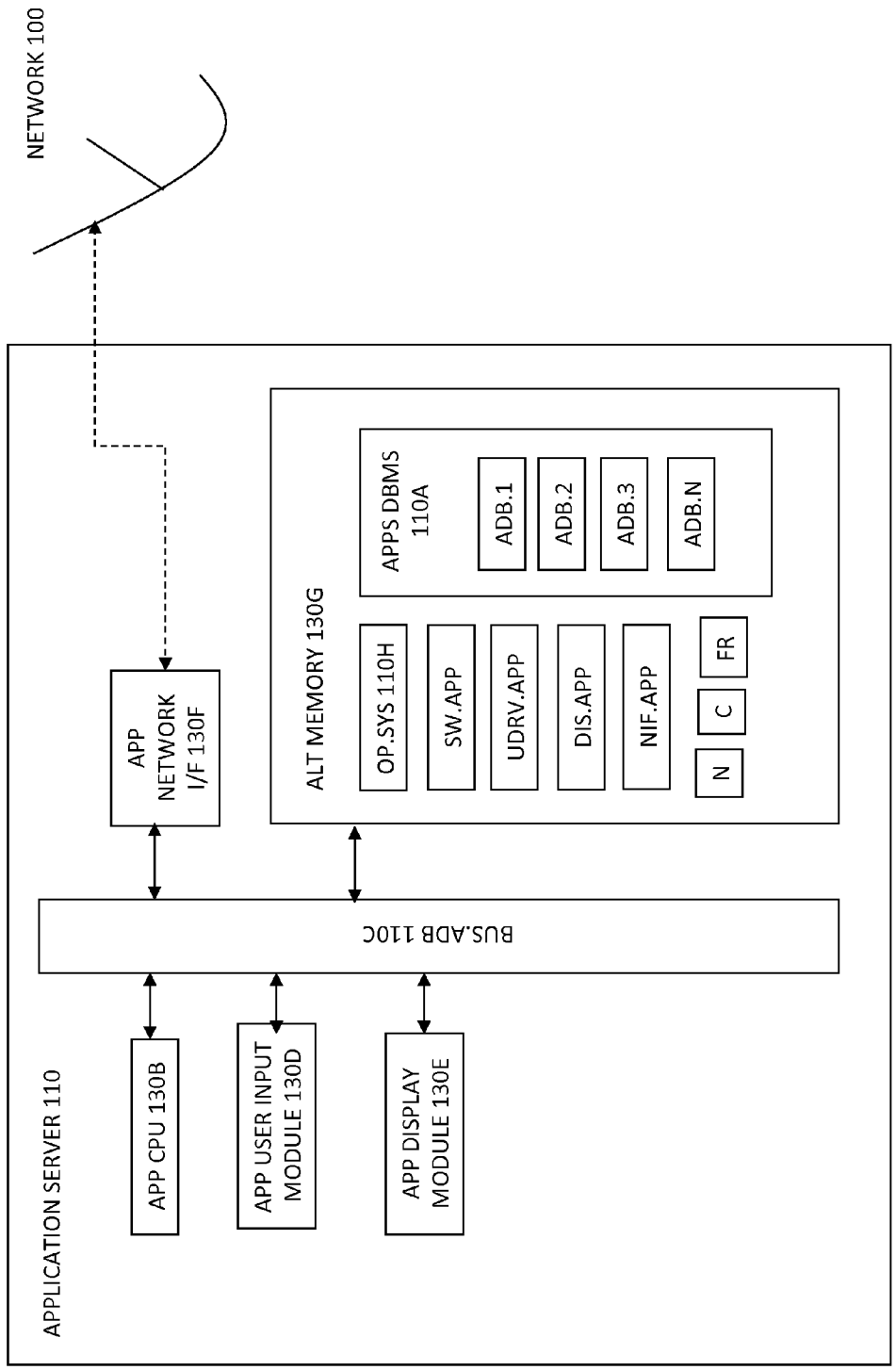
FIG. 7 is a block diagram of the application server of FIG. 1.

Referring now generally to the Figures and particularly to FIG. 7, FIG. 7 is a block diagram of the application server of FIG. 1.

An application system server operating system software OP.SYS 110H of the application server 110 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7 ™ operating system as marketed by Microsoft Corporation of Redmond, Wash.; or the MAC OS X operating system or iPhone G4 OS™ as marketed by Apple, Inc. of Cupertino, Calif.

The application server 110 further includes an application central processing unit 110B ("CPU 110B") that is bi-directionally communicatively coupled by an apps internal communications bus 110C with (a.) an optional apps user input module 110D that accepts input, e.g., information and commands, from a user, (b.) an optional apps video display module 110E that provides visual information rendering output, (c.) an apps network interface 110F that bi-directionally communicatively couples the application server 110 with the local database server 120 and remote database server 140, and (d.) an apps system memory 110G.

Figure 8:
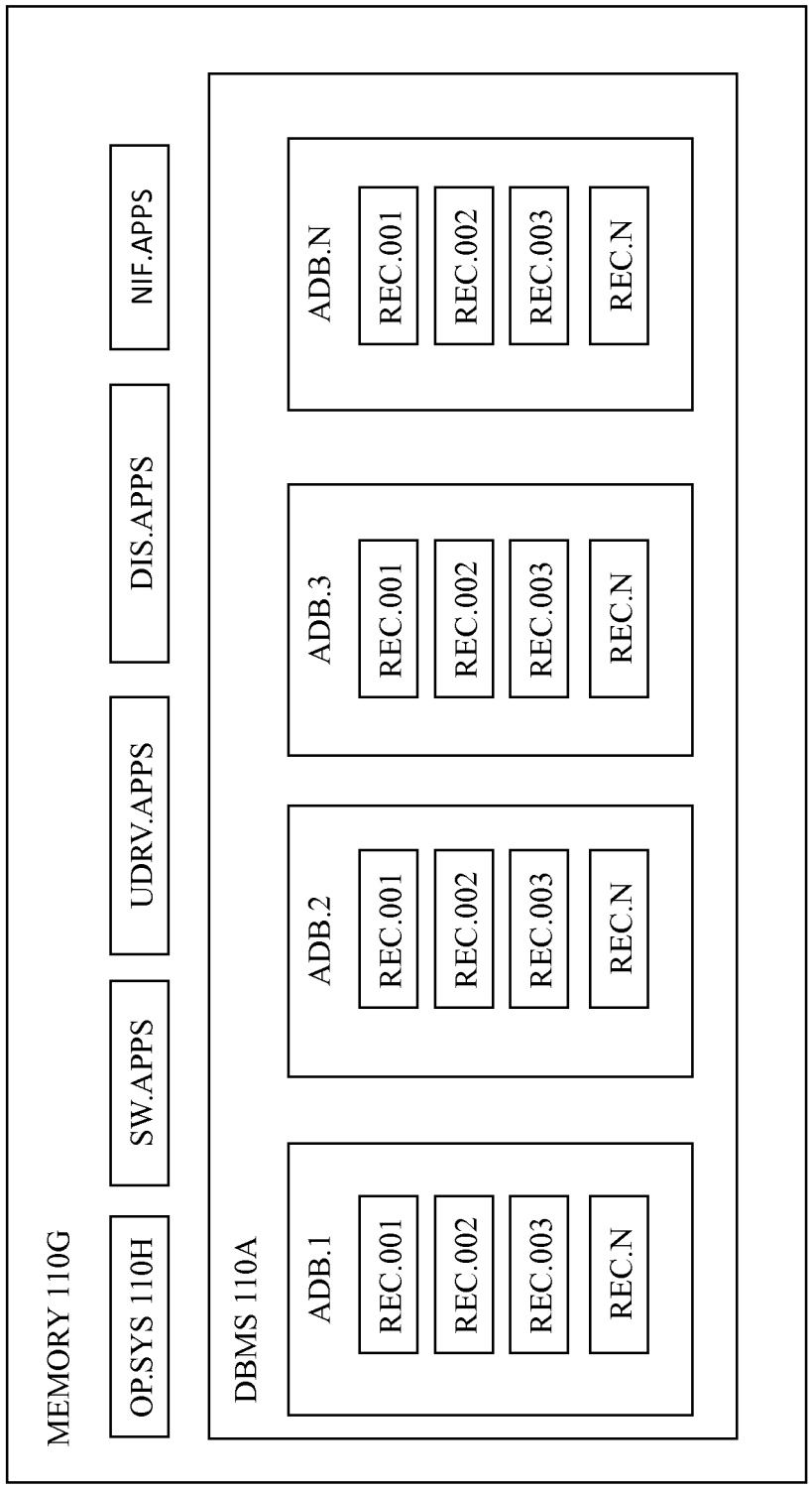
FIG. 8 is a block diagram of software stored within the application server of FIG. 1.

Referring now generally to the Figures and particularly to FIG. 8, FIG. 8 is a block diagram of software stored within the apps system memory 110G of the application server 110. Stored within the apps system memory 110G, is the apps operating system 110H, an apps server software SW.APPS, an apps user module driver UDRV.APPS, an optional apps display driver DIS.APPS, an apps network interface driver NIF.APPS enables the apps network interface 110F to bi-directionally communicatively couple the application server 110 with local database server 120 and the remote database server 140.

The app server software SW.APPS enables the application server 110 to execute, perform and instantiate aspects of the invented method as disclosed within FIGS. 2 through 6 and accompanying descriptions. The apps user input module driver UDRV.APPS enables the apps user module 110D to input information and commands entered by a user into the application server 110. The apps display driver DIS.APPS enables the application server 110 to visually render information by means of the apps video display module 110E. The apps network NIF.APPS enables the apps network interface module 110F to bi-directionally communicate with local database server 120 and the remote database server 140.

Within the apps DBMS 110A, there are multiple application databases ADB.1-ADB.N, each having database records REC.001, REC.002, REC.003 and REC.N. These records REC.001-REC.N may be shared with other servers 120 & 140 in the network 100.

Figure 9:
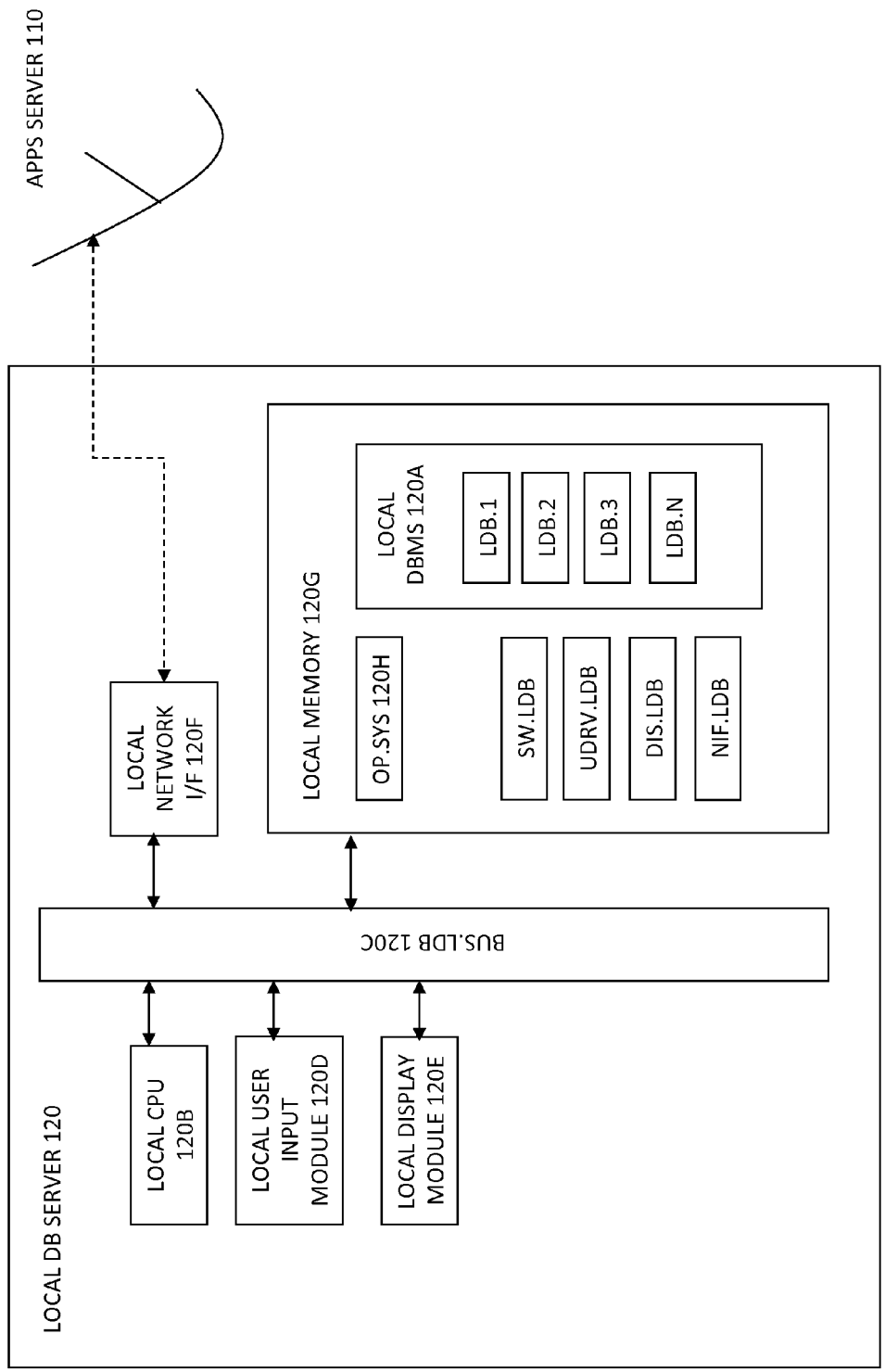
FIG. 9 is a block diagram of the local database server of FIG. 1.

Referring now generally to the Figures and particularly to FIG. 9, FIG. 9 is a block diagram of the local database server 120.

A local database server operating system software OP.SYS 120H of the local database server 120 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7 ™ operating system as marketed by Microsoft Corporation of Redmond, Wash.; or the MAC OS X operating system or iPhone G4 OS™ as marketed by Apple, Inc. of Cupertino, Calif.

The local database server 120 includes a local central processing unit 120B ("CPU 120B") that is bi-directionally communicatively coupled by a local internal communications bus 120C with (a.) a local user input module 120D that accepts input from a user, (b.) a local video display module 120E that visually renders information, (c.) a local network interface 120F that bi-directionally communicatively couples the local database server 120 with the application server 110 and optionally with the remote database server 140, and (a.) a local server system memory 120G.

Figure 10:
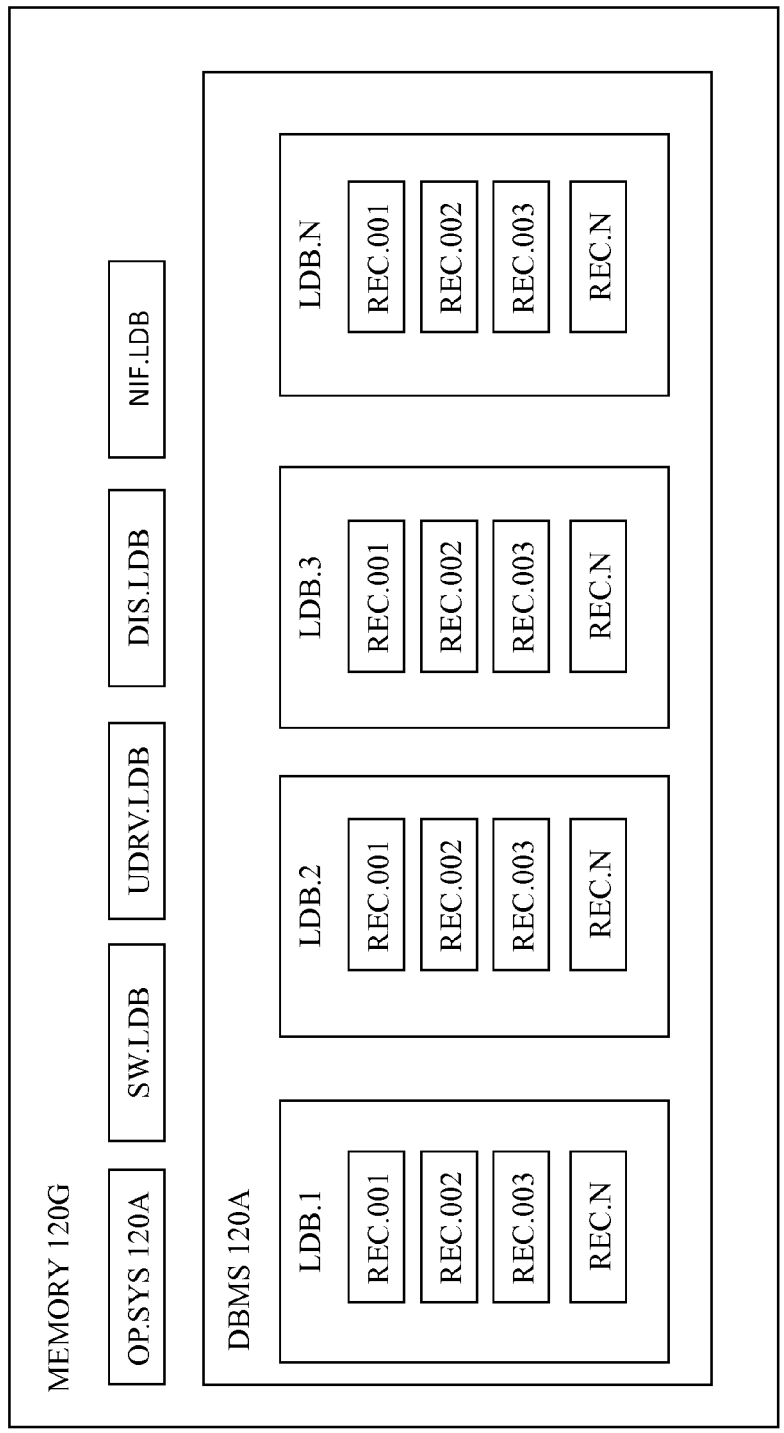
FIG. 10 is a block diagram of software stored within the local database server of FIG. 1.

Referring now generally to the Figures and particularly to FIG. 10, FIG. 10 is a block diagram of software stored within the local server system memory 120G of the local database server 120. Stored within the local server system memory 120G, is the local database server operating system software OP.SYS 120H, a local server software SW.LDB, an optional local user module driver UDRV.LDB, an optional local display driver DIS.LDB, and a local network interface driver NIF.LDB that enables the local network interface 120F to bi-directionally communicatively couple the local database server 120 with the application server 110.

The local server software SW.LDB enables the local database server 120 to execute, perform and instantiate aspects of the invented method as disclosed within FIGS. 2 through 6 and accompanying descriptions. The optional local user input module driver UDRV.LDB enables the optional local user module 120D to input information and commands entered by a user into the local database server 120. The local display driver DIS.LDB enables the local database server 120 to visually render information by means of the local video display module 120E. The local network interface driver NIF.LDB enables the local network interface module 120F to bi-directionally communicatively couple the local database server 120 and application server 110 and optionally the remote database server 140.

Within the local DBMS 110A, there are multiple local databases LDB.1-LDB.N, each having database records REC.001, REC.002, REC.003 and REC.N. These records REC.001-REC.N may be shared with the application server 110 and the remote database server 140. A first local database LDB.1 is or comprises a software representation of a table of data ("table").

Figure 11:
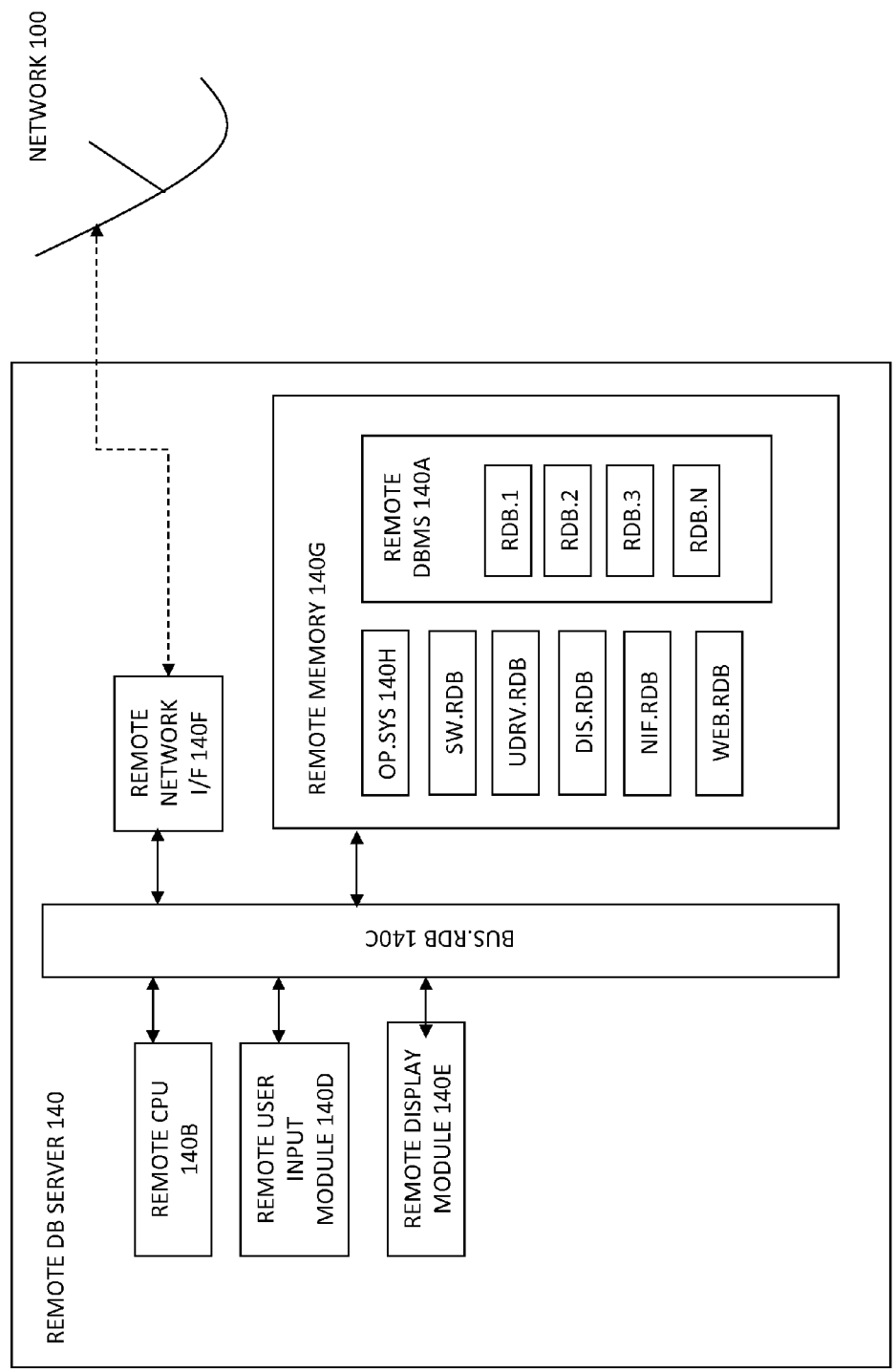
FIG. 11 is a block diagram of the remote database server of FIG. 1.

Referring now generally to the Figures and particularly to FIG. 11, FIG. 11 is a block diagram of the remote database server 140.

A remote database system server operating system software OP.SYS 140H of the remote database server 140 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7™ operating system as marketed by Microsoft Corporation of Redmond, Wash.; or the MAC OS X operating system or iPhone G4 OS™ as marketed by Apple, Inc. of Cupertino, Calif.

The remote database server 140 includes a remote central processing unit 140B ("CPU 140B") that is bi-directionally communicatively coupled by a remote internal communications bus 140C with (a.) an optional remote user input module 140D that accepts information and commands input by a user, (b.) a remote video display module 140E that visually renders information, (c.) a remote network interface 140F that bi-directionally communicatively couples the remote server 140 with application server 110, and (d.) a remote server system memory 140G.

Figure 12:
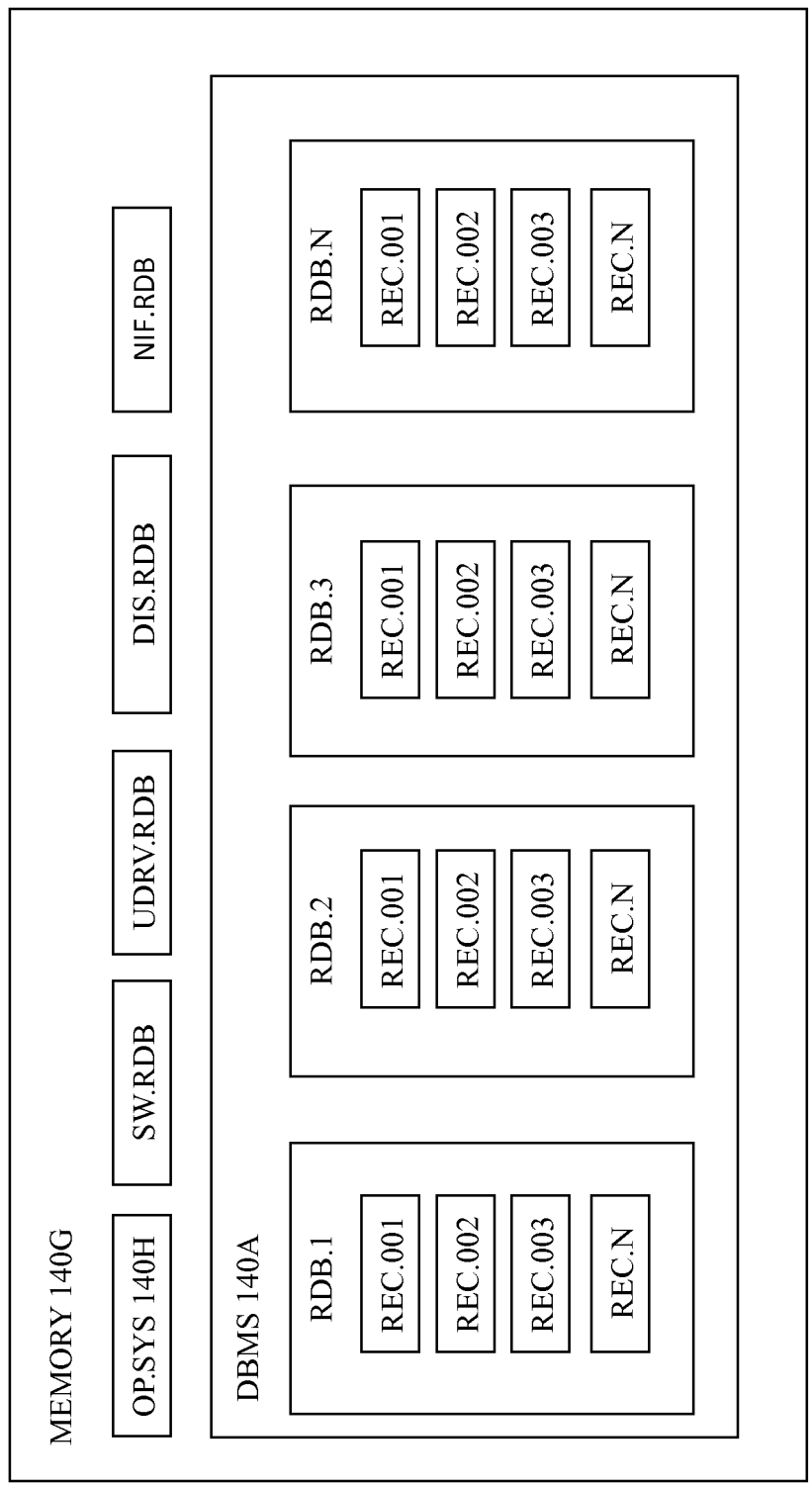
FIG. 12 is a block diagram of software stored within the remote database server of FIG. 1.

Referring now generally to the Figures and particularly to FIG. 12, FIG. 12 is a block diagram of software stored within the remote database server 140. Stored within the remote system memory 140G is the remote server operating system 140H, a remote server software SW.RDB, an optional remote user input module driver UDRV.RDB, an optional remote display driver DIS.RDB, a remote network interface driver NIF.RDB, and an optional webserver WEB.RDB.

The remote server software SW.RDB enables the remote database server 140 to execute, perform and instantiate aspects of the invented method as disclosed within FIGS. 2 through 7 and accompanying description. The remote server software SW.RDB may comprise one or more prior art of commercially available software adapted for downloading and updating a database, such as SALESFORCE™ database management software marketed by Software.com, Inc. of San Francisco, Calif.; QUICKBOOKS™ database management software marketed by Intuit, Inc. of Mountain View, Calif.; NETSUITE™ database management software of San Mateo, Calif.; and/or other suitable software known in the art.

The remote user input module driver UDRV.RDB enables the remote user input module 140D to input information and commands into the remote database server 140. The remote display driver DIS.RDM enables the remote database server 140 to visually render information by means of the remote video display module 140E. The remote network interface driver NIF.RDB enables the remote network interface module 140F to bi-directionally communicate with application server 110.

The webserver WEB.RDB enables the remote database server 140 provide and instantiate a web service in conformance with the communications protocols of the World Wide Web to communicate Ucount values to the application server and/or effect downloads of record data REC.DATA.001-REC.DATA.N to the application server 110 and optionally to the local database server 120. The webserver WEB.RDB may optionally (a.) communicate Ucount values to the application server 110 in step 3.08 of the method of FIG. 3, and/or (b.) effect downloads of record data REC.DATA.001-REC.DATA.N to the application server 110 and optionally to the local database server 120 in step 3.12 of the method of FIG. 3.

Within the remote server DBMS 140A, there are multiple remote server databases RDB.1-RDB.N, each having database records REC.001, REC.002, REC.003 and REC.N. These records REC.001-REC.N may be shared with other servers 110 & 120 of the network 100.

Figures 13A, 13B, 13C:
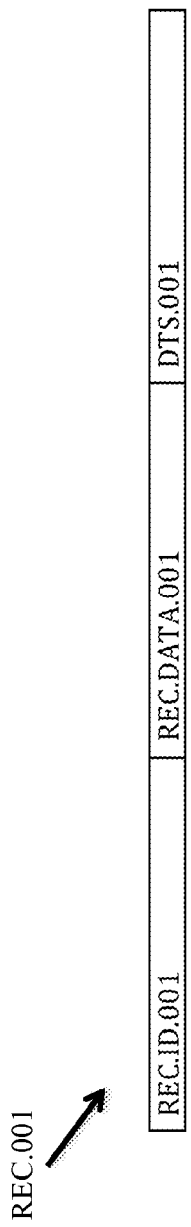
FIG. 13A is a block diagram of a first sample of a software data record stored within the remote database server, the local database server, and optionally the application server of FIG. 1.
FIG. 13B is a block diagram of a second sample of a software data record stored within the remote database server, the local database server, and optionally the application server of FIG. 1.
FIG. 13C is a block diagram of a third sample of a software data record stored within the remote database server, the local database server, and optionally the application server of FIG. 1.

FIG. 13A through FIG. 13C are separate block diagrams of a sampling records REC.001-REC.N stored within the remote database server 140, the local database server 120, and optionally the application server 110. An exemplary first database record REC.001 presented in FIG. 13A includes a first record identifier REC.ID.001, a first data element REC.DATA.001 and a date-time stamp DTS.001.

An exemplary second database record REC.002 presented in FIG. 13B includes a second record identifier REC.ID.002, a second data element REC.DATA.002 and a date time stamp DTS.002.

An exemplary Nth database record REC.N presented in FIG. 13C presents an Nth record identifier REC.ID.N, an Nth data element REC.DATA.N and an Nth date time stamp DTS.N.

Figure 14A:
FIG. 14A is a block diagram of a Ucount request message wherein the application server of FIG. 1 requests a count of data records stored within a remote data base management system of the remote data base server of FIG. 1.

FIG. 14A is a block diagram of a unique exemplary first Ucount request message UREQ.001 wherein the application server 110 requests a Ucount of data records REC.001-REC.N stored within the remote DBMS 140A of the remote data base server 140 that are each associated with a date time stamp DTS.001-DTS.N falling within a specified time range defined by the current T0 value and the current TR value. The first Ucount message U.MSG.001 includes a unique first Ucount request message identifier UREQ.ID.001, a remote server network address RDB.ADDR of the remote database server 140 as a destination address, an application server network address APP.ADDR of the application server 110 as a sender address, a Ucount request command UREQ.COM, a T0 value and a TR value. Ucount request messages UREQ.001-UREQ.N may be messaged via the network 100 from the application server 110 to the remote database server 140 in various aspects and optional aspects of the invented method, including, but not limited to, step 2.07 of the process of FIGS. 2, 5 and 6.

Figure 14B:
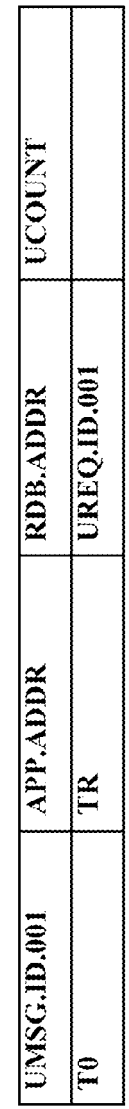
FIG. 14B is a block diagram of an exemplary first Ucount provision message wherein the remote database server of FIG. 1 provides to the apps server of FIG. 1 a count of data records stored within the remote data base server of FIG. 1.

FIG. 14B is a block diagram of an exemplary first Ucount provision message UMSG.001 wherein the remote database server 140 provides to the apps server 110 a Ucount of data records REC.001-REC.N stored within the remote DBMS 140A of the remote data base server 140.

The first Ucount provision message UMSG.001 includes a unique exemplary first Ucount provision message identifier UMSG.ID.001, the application server network address APP.ADDR of the application server 110 as a destination address, the remote server network address RDB.ADDR of the remote database server 140 as a sender address, optionally the first Ucount request message identifier UREQ.ID.001 as previously messaged from the application server 110 to the remote database server 140, an exemplary first Ucount, optionally a T0 value and/or a TR value applied by the remote database server 140 to generate the exemplary first Ucount. Ucount provision messages UMSG.001-UMSG.N may be transmitted from the remote database server 140 to the application server 110 in various aspects and optional aspects of the invented method, including, but not limited to, step 3.08 of the process of FIG. 3. Ucount provision messages UMSG.001-UMSG.N may be received by the application server 120 in various aspects and optional aspects of the invented method, including, but not limited to, step 2.08 of the process of FIGS. 2, 4, 5 and 6.

Figure 14C:
FIG. 14C is a block diagram of an exemplary first data record download request message wherein the application server of FIG. 1 requests a plurality of data records stored within the remote data base server of FIG. 1.

FIG. 14C is a block diagram of an exemplary first data record download request message DR.REQ.001 wherein the application server 110 requests a plurality of data records REC.001-REC.N stored within the remote DBMS 140A of the remote data base server 140 that are each associated with a date time stamp DTS.001-DTS.N falling within a specified a time range defined by the current T0 value and the current TR value.

The first data record download request message DR.REQ.001 includes a unique first data record download request message identifier DR.REQ.ID.001, the remote server network address RDB.ADDR of the remote database server 140 as a destination address, the application server network address APP.ADDR of the application server 110 as a sender address, a data record download request command DR.COM, a T0 value and a TR value. One or more data record download request messages DR.REQ.ID.001-DR.REQ.ID.N may be sent from and by the application server 110 in various aspects and optional aspects of the invented method, including, but not limited to, step 2.12 of the process of FIG. 2, and step 4.12 of the process of FIG. 4.12. One or more data record download request messages DR.REQ.ID.001-DR.REQ.ID.N may be received by the remote server 140 in various aspects and optional aspects of the invented method, including, but not limited to, step 3.10 of the process of FIG. 3.

FIG. 14D is a block diagram of an exemplary first data record download message DLOAD.001 wherein the remote database server 140 provides to the application server 110 a plurality of data records REC.001-REC.N stored within the remote DBMS 140A of the remote data base server 140 that are each associated with a date time stamp DTS.001-DTS.N falling within a specified a time range defined by the current T0 value and the current TR value.

The first data record download message DLOAD.001a unique first data record download message identifier DLOAD.ID.001, the application server network address APP.ADDR of the application server 110 as a destination address, the remote server network address RDB.ADDR of the remote database server 140 as a sender address, and a plurality of data records REC.001-REC.N.

One or more data record download messages DLOAD.001-DLOAD.N may be transmitted by the remote database server 140 to the application server 110 in various aspects and optional aspects of the invented method, including, but not limited to, step 3.12 of the process of FIG. 3. One or more data record download messages DLOAD.001-

DLOAD.N may be received by the application server 110 in various aspects and optional aspects of the invented method, including, but not limited to, step 2.12 of the process of FIG. 2 and step 4.12 of the process of FIG. 4.

FIG. 14E is a block diagram of an exemplary first data record download transferal message TLOAD.001 wherein the application server 110 provides to the local database server a plurality of data records REC.001-REC.N received by the application server 110 from the remote database server 140.

The first data record download transferal message TLOAD.001 includes a unique first data record download transferal message identifier TLOAD.ID.001, a local database server network address LDB.ADDR of the local database server 120 as a destination address the application server network address APP.ADDR of the application server 110 as a sender address, and a plurality of data records REC.001-REC.N.

One or more data record download transferal messages TLOAD.001-TLOAD.N may be transmitted by the application server 110 and received by the local data base server 120 in various aspects and optional aspects of the invented method, including, but not limited to, step 2.13 of the processes of FIG. 2, FIG. 5, and FIG. 6, and step 4.13 of FIG. 4.

Figure 15:
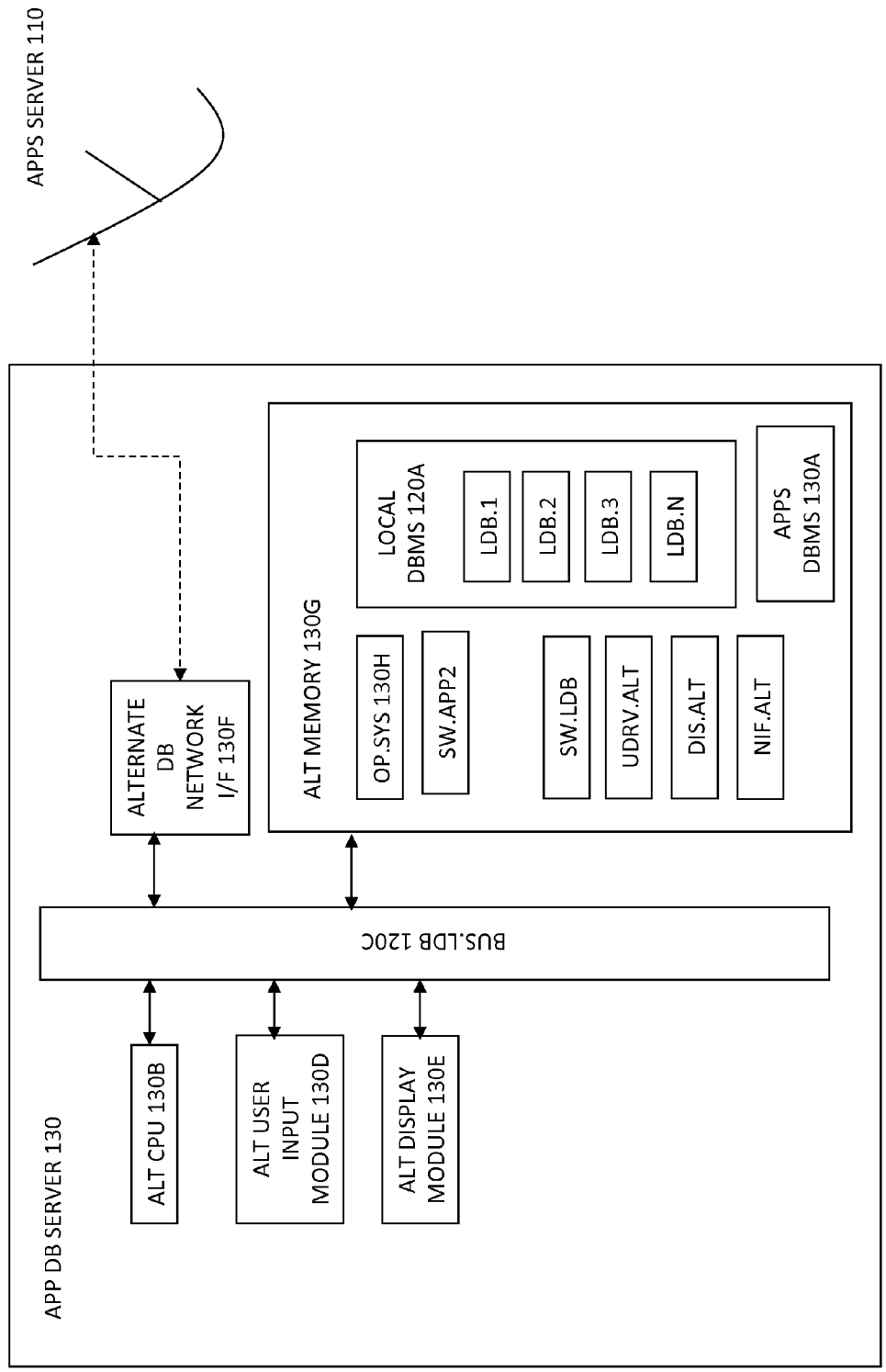
FIG. 15 is a block diagram of the alternate application database server of FIG. 1.

Referring now generally to the Figures and particularly to FIG. 15, FIG. 15 is a block diagram of the apps DB server 130, wherein the apps DB server 130 comprises the local DBMS 120A and an alternate application server software SW.APP2.

The alternate application server software SW.APP2 is adapted to enable the apps DB server 130 bi-directionally communicate with both the native local DBMS 120A and the remote server 140 to practice the aspects of the processes of FIG. 2, FIG. 4, FIG. 5, and FIG. 6 with the variation that the local DBMS 120A is updated by the receipt of data records REC.001-REC.N in step 2.13 of the processes of FIG. 2, FIG. 5, and FIG. 6, and step 4.13 of FIG. 4

More particularly, the alternate application server software SW.APP2 is adapted to enable the apps DB server 130 to provide the functionality of the local database server 120 in addition to the functionality of the application server 110 and thereby provide the dual functionality of both the local database server 120 and the application server 110 in a same computational device.

The apps DB server 130 alternate further includes an alternate DB central processing unit 130B ("CPU 130B") that is bi-directionally communicatively coupled by an alternate internal communications bus 130C with (a.) an optional alternate user input module 130D that accepts input, e.g., information and commands, from a user, (b.) an optional alternate video display module 130E that provides visual information rendering output, (c.) an alternate network interface 130F that bi-directionally communicatively couples the apps DB server 130 with the remote database server 140, and (d.) an alternate system memory 130G.

Stored within the alternate server system memory 130G, are the apps DBMS 130A, an alternate database server operating system software OP.SYS 130H, the alternate application server software SW.APP2, an optional alternate server user module driver UDRV.APP, an optional alternate server display driver DIS.APP, and an alternate server network interface driver NIF.APP that enables the alternate server network interface 130F to bi-directionally communicatively couple the alternate database server 130 with the application server 110.

The alternate application server software SW.APP2 enables the alternate database server 130 to execute, perform and instantiate aspects of the invented method as disclosed within FIGS. 2 through 6 and accompanying descriptions. The optional alternate user input module driver UDRV.APP enables the optional alternate user module 130D to input information and commands entered by a user into the apps DB server 130. The alternate network interface driver NIF.APP enables the alternate network interface module 130F to bi-directionally communicatively couple the apps DB server 130 with the remote database server 140.

It is understood that the indicator N of the FIGS. 8 through 13 represent an arbitrarily large number that has no relevance nor relationship to the value N of step 2.08 of the methods of FIG. 2, FIG. 4, FIG. 5 and FIG. 6.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

We claim:

1. In an electronics communications network ("the network") comprising an application server and a remote server, a computer-implemented method comprising, the application server having a processor and a bi-directionally communicatively coupled memory, the memory storing a plurality of executable instructions that, when executed by the processor, facilitate performance of operations, wherein the computer-implemented method further comprising:
   a. establishing a database management software ("DBMS") at the database server, the DBMS adapted to update a first database of the database server with information received from the remote server;
   b. the application server receiving a count of individual database records that have been updated at the remote server within an identified time range;
   c. when the count of individual database records is less than a pre-specified maximum count, the application server directing the remote server to download a corresponding plurality of database records as enumerated by the count of individual database records via the network;
   (d.) upon a determination by the processor that the count of individual database records exceeds the pre-specified maximum count, the application server requesting a second count of individual database records from the remote server associated within a briefer time range smaller than and comprised within the identified time range.

2. The method of claim 1, wherein the identified time range extends from a time of a database record update approximately most recently received from the remote server.

3. The method of claim 1, further comprising the application server requesting the count of individual database records from the remote server.

4. The method of claim 3, wherein the identified time range extends approximately to a time of the application server requesting the count of individual database records from the remote server.

5. The method of claim 1, further comprising the application server separating the identified time range into substantively equal time slices and assigning each substantively equal time slice to an individual thread, wherein each thread receives database records associated within each corresponding assigned time slice from the remote server.

6. The method of claim 1, wherein the briefer time range extends approximately from a time of a database record update most recently received from the remote server.

7. The method of claim 1, further comprising the application server requesting the first received count of individual database records from the remote server.

8. The method of claim 1, wherein the second time range extends approximately to a time of the application server requesting the second count of individual database record updates from the remote server.

9. The method of claim 1, further comprising the application server separating the briefer time range into time slices and assigning each time slice to an individual thread, wherein each thread receives database records associated within each corresponding assigned time slice from the remote server.

10. The method of claim 1, wherein a duration of the briefer time range is more than one half of a first duration of the identified time range.

11. The method of claim 1, wherein a duration of the briefer time range is less than or equal to one half of a first duration of the identified time range.

12. The method of claim 9, wherein each time slice is approximately equal in duration.

13. The method of claim 1, wherein a duration of the briefer time range is a fractional value of a first duration of the identified time range in approximate proportion to a ratio of the first received count of individual database records to the pre-specified maximum count.

14. The computer implemented method of claim 1, wherein the first database comprises a table.

15. The computer implemented method of claim 1, wherein the application server and a local DBMS are embodied in a same computational system, wherein the corresponding plurality of database records are downloaded from the remote server to the same computational system and are stored within the local DBMS.

16. The computer implemented method of claim 1, wherein the application server communicates with the remote server from a first computational system and a local DBMS resides substantively within a second computational system, wherein the corresponding plurality of database records are downloaded from the remote server to the second computational system and are stored within the local DBMS.

17. The computer implemented method of claim 1, wherein the count of individual database records is provided to the application server as a web service.

18. The computer implemented method of claim 17 wherein the web service is distributed within the Internet.

* * * * *